UNITED STATES PATENT OFFICE.

BARTOW JOHNSON, OF COMANCHE, TEXAS.

VENTILATING APPLIANCE.

No. 795,443.   Specification of Letters Patent.   Patented July 25, 1905.

Application filed September 6, 1904. Serial No. 223,519.

*To all whom it may concern:*

Be it known that I, BARTOW JOHNSON, a citizen of the United States, residing at Comanche, in the county of Comanche and State of Texas, have invented certain new and useful Improvements in Ventilating Appliances; and I do hereby declare the following to be a full, clear, and exact description of the invention, such as will enable others skilled in the art to which it appertains to make and use the same.

My invention relates to means for ventilating a storage-warehouse or other building; and it consists of certain novel features of combination and construction of parts, the preferred form whereof will be hereinafter clearly set forth, and pointed out in the claim.

The prime object of my invention, among others, is to insure that the air introduced into the building shall be laden with the requisite amount of moisture and shall be reduced to the desired temperature before introduction into the storage-warehouse or other place to be ventilated or supplied with fresh cool air.

A further object of my invention is to provide simple though reliably-efficient means for imparting to the air introduced into the storage-warehouse or other place the desired degree of moisture, which I am enabled to accomplish in a very simple but thoroughly reliable manner.

Other objects and advantages will be hereinafter made clearly apparent, reference being had to the accompanying drawings, which are made a part of this application, and in which—

Figure 1 shows a longitudinal sectional view of my air-conveying chute and contiguous part of the building to which the air-introducing chute is connected. Fig. 2 is a sectional view of Fig. 1 on line 2 2. Fig. 3 is a detail view in perspective, showing means employed by me to provide a requisite quantity of moisture, whereby the air passing through the chute will be properly supplied therewith. Fig. 4 is a perspective view of my invention complete as applied to use. Fig. 5 is a sectional view of Fig. 1 on line 5 5.

For convenience of reference to the various details and coöperating accessories of my invention characters will be employed, the same characters applying to a similar part throughout the several views.

Referring to the characters on the drawings, 1 designates the side walls forming my air-introducing chute, which are made of the inner and outer parallel sections *a* and *b*, respectively, separated a sufficient distance to receive between them a filling 2, of sawdust, pulverized asbestos, or other preferred material, whereby the heat will be excluded from the chute formed by said walls. The roof-section (designated by the numeral 3) is also made in parallel sections *c* and *d* and has a filling 2 similar to the filling introduced into the side walls. The floor 4 of the chute or way as constructed is formed, preferably, of cement and inclined toward the center from both walls, so that said floor will drain toward the center of the chute.

At the inner end of the chute the side walls are placed wider apart than in the main chute, said side walls being designated by the numeral 5. The side walls 5 are formed in a manner similar to the side walls 1 and are also provided with a suitable filling 2, of sawdust, asbestos, or the like, as before described.

The roof-section of the side walls 5 is formed by a lattice-work, as a plurality of cross-bars 6 and 7 or equivalent thereof, whereby a grating with small openings throughout its surface is provided, and upon said grating or open-work I dispose a quantity of porous substance, as gravel, sand, or the like 7, said substance being held in position by a plurality of bars 8, placed upon the upper edges of the said walls 5, or the side walls 5 may be extended upward a proper height, as will be obvious.

The cross-bars 6 and 7 are provided upon their under sides with a plurality of depending flexible members 9, of canvas or the like, and it is obvious that when water is introduced into the gravel or sandy substance it will percolate downward through the same and finally reach the depending flexible members 9, of canvas, which will become thoroughly saturated, and the water will finally drip therefrom and will also evaporate and pass away with the air forced through the chute, which, it will be observed, leads into the hollow chamber 10 between the walls 11 and 12 and thence passes into an opening in the wall 13 of the building, the floor of the building being also formed of open-work, as iron gratings and the like, up through the interstices of which will pass the air highly charged with moisture and cooled to the desired degree, the grating or open-work of the floor of the building being designated by the numeral 14 in Fig. 1.

It will be understood that the air may be forced through the chute thus constructed by any suitable means, and inasmuch as the wa- No. 795,444. PATENTED JULY 25, 1905.
F. KALES.
STUFFING BOX.
APPLICATION FILED OCT. 17, 1904.
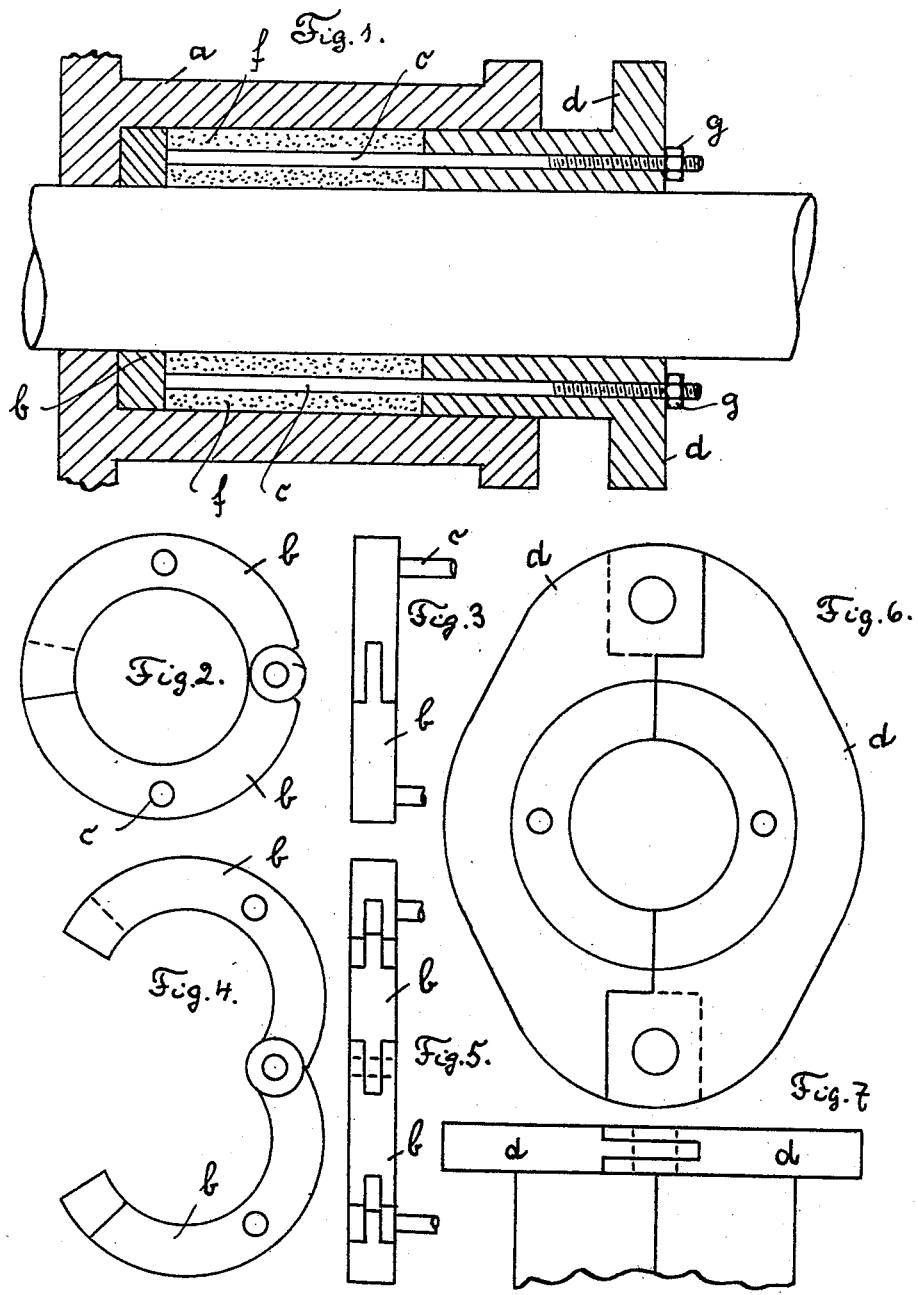
WITNESSES:-
INVENTOR.-